Dec. 18, 1962   M. ARMAND   3,069,240
METHOD OF OBTAINING PURE SILICON BY FRACTIONAL CRYSTALLIZATION
Filed Jan. 20, 1959
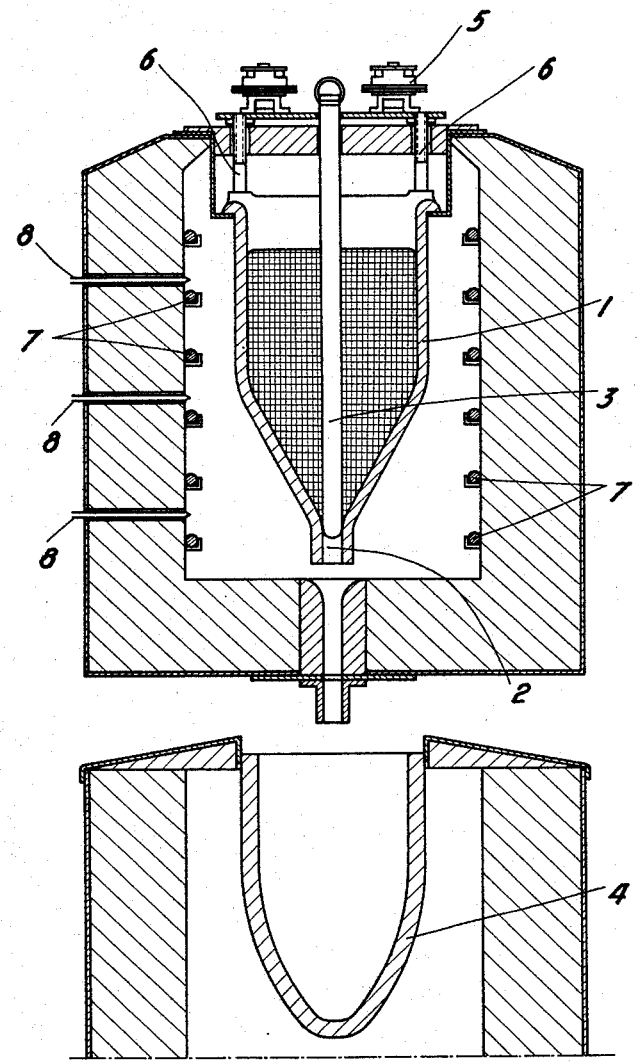

United States Patent Office 3,069,240
Patented Dec. 18, 1962

3,069,240
METHOD OF OBTAINING PURE SILICON BY FRACTIONAL CRYSTALLIZATION
Marcel Armand, Albertville, France, assignor to Societe d'Electro-Chimie, d'Electro-Metallurgie et des Acieries Electriques d'Ugine, Paris, France, a corporation of France
Filed Jan. 20, 1959, Ser. No. 788,009
Claims priority, application France Jan. 24, 1958
9 Claims. (Cl. 23—223.5)

The present invention relates to a method of fractional crystallization for the production of silicon having a content of more than 99.95% silicon and less than five hundredths percent of aluminum.

The known methods consist either in treating various compounds of silicon by reduction, dissociation at high or low temperature or electrolysis, or alternatively in purifying the more or less pure silicon obtained from one of the above operations.

With the exception of the process carried out by reduction of the oxide $SiO_2$ which in its most simple form produces a 98% silicon, all these other known processes are delicate and costly to put into practical use, both on account of the very pure starting materials which they require, and also because of the difficult techniques necessarily employed (for example, high temperatures, high vacuum, controlled atmosphere), and also on account of difficulties which have not been completely overcome, such as those relating to the performance of materials and the pressure-tightness of refractory substances at high temperatures.

In industrial practice, only the method of reducing silicon tetrachloride by zinc is used to obtain a silicon of high purity, which latter is subsequently further purified by the molten zone method, so as to obtain pure semiconductor silicon. In spite of the efficiency of this method, the desired purity is not obtained when the coefficient of division of the impurity in question between the liquid and the solid is in the vicinity of 1, which is precisely the case of certain impurities in silicon, such as boron, phosphorous and arsenic.

The object of the present invention is to obviate the disadvantages of methods known up to the present time for the preparation of pure silicon. The method forming the object of the present invention makes use of fractional crystallization of silicon in liquid aluminum, and the difference in solubility of the impurities of the silicon, on the one hand in the silicon crystals deposited by cooling from a saturated solution in aluminum, or on the other hand in the mother liquid.

The method of obtaining pure silicon by fractional crystallization in accordance with the present invention consists fundamentally in forming an alloy with a base of silicon and aluminum by dissolving an impure silicon in a solvent metal with an aluminum base at a temperature about 30° to 50° C. higher than the point of solidification of the alloy; treating the liquid alloy by stirring with 1 to 2% of its weight of a flux containing 80% of sodium chloride and 20% of cryolite, or preferably sodium fluoride, with the object of eliminating the oxygen, carbon and phosphorous combined or contained in the alloy; cooling the alloy following a linear or cubic law, so that a sponge is formed having large crystals, drawing off the greater part of the mother liquid before complete solidification of the alloy at a temperature which is at least equal to the melting temperature of the eutectic formed by the solvent and the silicon; separating the last traces of the mother liquid from the sponge together with the complex compounds deposited during cooling; and collecting the pure silicon.

The impure silicon used as the starting material may be an alloy with a silicon base.

The solvent metal may be either more or less pure aluminum, or an aluminum alloy containing silicon, zinc, tin, titanium, etc.

The aluminum may contain traces of lead in order to facilitate the separation of the mother liquid by reducing the interfacial tension between the silicon and the mother liquid. The proportions of lead should preferably be between 0.1% and 0.2% of the weight of aluminum.

The treatment prior to the collection of the pure silicon may be repeated several times, utilizing for each operation, as a solvent metal, either the same metal or a metal of a different composition, chosen in dependence on the various impurities to be eliminated, or an alloy obtained from a subsequent operation of a previous cycle, the last treatment being then carried out with refined aluminum in order to eliminate all impurities other than aluminum.

The cooling of the alloy is preferably controlled so as to follow a linear law $T=Kt$ (the cooling rate per hour being at most equal to about 30° C.) or preferably a cubic law $T=K_1 t^3$ where $K_1$ has a value equal to or less than 0.08 but greater than 0, $t$ being the time in hours and $T$ being the fall in temperature in ° C. below the starting point of solidification of the alloy. This latter law has the advantage that it maintains almost constant the speed of linear growth of the crystals, and thus facilitates their increase in size. In practice, it is easy to ensure that the cooling is controlled by employing the device for regulating a quantity in accordance with a set program which forms the subject of French Patent No. 1,012,444 of September 12, 1949.

The elimination of traces of mother liquid from the crystalline sponge of silicon and the elimination of the ternary or more complex compounds deposited during cooling, is carried out on the one hand by physical means (grinding, flotation, etc.), and on the other hand by a chemical process (for example by selective attack with aqua regia).

Finally, the mother liquids which are too heavily loaded with impurities are recycled in subsequent operations for the manufacture of Al–Si alloy.

The following diagram serves to illustrate the process in accordance with the invention:

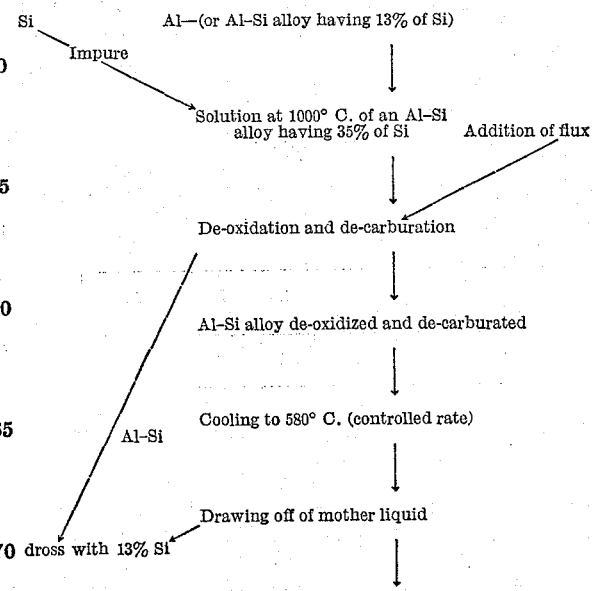

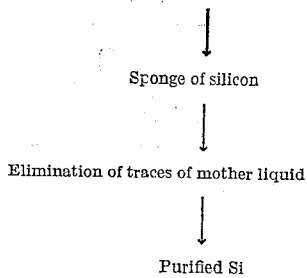

Any furnace may be employed for the melting of the silicon in the solvent metal and for the treatment with flux. For the other operations, it is preferable to work with an electric crucible furnace, such as for example the type shown in the drawings with reference to which the practical operation of the process in accordance with the invention will be described in detail.

An aluminum-silicon alloy is treated with flux and charged into the crucible 1 of stainless steel; the crucible 1 is provided at its lower portion with an orifice 2 closed by means of a steel plug 3 which is pulled out at the moment when the mother liquid is drawn-off. During this operation, the mother liquid flows either into an ingot mold or into a second furnace 4 which is identical with the first. The portions of the crucible and of the plug which are in contact with the liquid metal are protected by a suitable coating having for example a base of kaolin, alumina and silicate of soda.

Such an arrangement has many advantages, since the withdrawal of the plug creates a chimney in the interior of the crystalline sponge, enabling a better evacuation of the mother liquid to be effected. The separation of the last drops of mother liquid adhering to the crystals may be still further improved by a vibrating device 5 of any known type, rigidly fixed to the crucible by the rods 6, and setting up vertical accelerations which are directed upwards.

In all cases, the uniformity of the temperature in the furnace should be carefully controlled; a slight difference of temperature (5 to 10° C.) may however be maintained between the top and the bottom of the crucible, at least at the begining of the cooling period, since this has a favorable effect on the orientation of the crystals and this in turn facilitates the flow of the mother liquid.

The temperature regulators which control the heating of the resistances 7 of the furnace by means of thermoelectric couples 8, are provided with suitable program devices in order to ensure precise control of the rates of cooling.

A few examples of applications of the method according to the invention are given below.

*Example I*

20 kgs. of silicon-aluminum obtained by heat process and having the following analysis:

| Fe, percent | Ca, percent | Ti, percent | C, percent | Si, percent | Al, percent |
|---|---|---|---|---|---|
| 3.0 | 0.50 | 1.5 | 1.5 | 32.8 | remainder | were treated in one operation in an electric furnace of the type shown. After melting at 1,000° C. and treatment with NaCl-cryolite flux they were cooled for 14 hours to 580° C. according to a linear law.

The separation of the mother liquid supplied 10 kgs. of Al-Si alloy containing 0.75% of iron and 12.5% of silicon, and a crystalline sponge of 7.9 kgs.

The treatment of this sponge with aqua regia left a residue of 3.7 kgs. of silicon having the following analysis:

| Fe, percent | Ca, percent | Ti, percent | Al, percent | P, percent |
|---|---|---|---|---|
| 0.02 | 0.04 | 0.002 | 0.04 | 0.0006 |

The remaining 6.2 kgs. represented the losses in the furnace and the carbides (2 kgs.) crystals of definite compounds: Al—Fe—Si—Ca, etc. (3.5 kgs.) and the adhesions of mother liquid (0.7 kg.). The efficiency in production of silicon was 56%.

*Example II*

(1) 87.8 kgs. of 97% pure silicon obtained by a heat process and having the following analysis:

| Fe, percent | Ca, percent | Ti, percent | C, percent | Al, percent | B, percent | P, percent | Si, percent |
|---|---|---|---|---|---|---|---|
| 0.72 | 0.63 | 0.04 | 0.03 | 0.55 | 0.005 | 0.003 | remainder | were melted at 1050° C. under a covering of flux composed of 80% NaCl and 20% of cryolite, with 162.9 kgs. of 99.5% aluminum containing 0.25% of iron, in an apparatus similar in design to that shown in the drawing. After cooling to 580° C. in about 20 hours, 173 kgs. of Al—Si alloy containing 0.46% of iron and 15.3% of silicon were drawn off. The treatment of the silicon sponge with aqua regia left a residue of 54 kgs. having the following analysis:

| Fe, percent | Ca, percent | Ti, percent | Al, percent | B, percent | P, percent | Si, percent |
|---|---|---|---|---|---|---|
| 0.003 | 0.005 | 0.001 | 0.12 | 0.0013 | 0.004 | remainder |

The efficiency in production of silicon by this operation was 61.5%.

(2) 11.1 kgs. of silicon thus obtained were in turn remelted at 1,000° C. with 21 kgs. of refined aluminum, 99.99% pure, in seven successive operations of 4.6 kgs., in a small electric tilting furnace. After cooling to about 600° C. at a rate of 30° C. per hour, 20.07 kgs. of Al—Si alloy with 17.45% of silicon were poured off simply by tilting the furnace; and 6.06 kgs. of silicon were then recovered by treatment with aqua regia and contained the following:

| Fe, percent | Ca, percent | Ti, percent | Al, percent | B, percent | P, percent | Si, percent |
|---|---|---|---|---|---|---|
| 0.0001 | traces | traces | 0.15 | 0.0004 | 0.0002 | remainder |

The overall efficiency in production of silicon throughout the seven operations was 54.5%.

(3) 6.02 kgs. of the product thus obtained were subjected to further treatment in four operations similar to those carried out previously, with 11.28 kgs. of 99.99% aluminum, and gave 11.23 kgs. of an alloy having 16.4% of silicon, and 3.397 kgs. of silicon which only contained traces of iron, and

| Al, percent | B, percent |
|---|---|
| 0.13 | 0.00015 |

The overall efficiency in production of silicon in the course of the four operations was 56%.

(4) A fourth treatment carried out in two operations on 3.2 kgs. of the previous silicon with 6.0 kgs. of 99.99% pure aluminum enabled a further 6.05 kgs. of Al—Si alloy to be obtained, having 15.9% of Si, and 1.842 kgs. of silicon containing:

| Al, percent | B, percent |
|---|---|
| 0.12 | 0.00005 |

The overall efficiency in production of silicon from both operations was 58%.

(5) Finally, a last washing of 1.7 kgs. of this product with 3.2 kgs. of 99.99% pure aluminum produced 3.1 kgs. of Al—Si alloy having 16.5% of Si, and 1.085 kgs. of silicon containing only 0.00002% of boron but still 0.15% of aluminum. After grinding the crystals and proceeding to a new acid treatment, this content was however easily reduced to 0.03%.

The efficiency in production of silicon for this operation was 65.5%.

The overal efficiency in production of silicon throughout the whole of the treatment is thus given by:

$$\frac{61.5}{100} \times \frac{54.5}{100} \times \frac{56}{100} \times \frac{58}{100} \times \frac{65.5}{100} = 7.1\%$$

With a single treatment in an extremely simple apparatus, it was thus possible to obtain with a reasonable efficiency, in the first case a product containing about 99.9% of silicon and in the second case a product having a content of more than 99.95%, in both cases starting with inexpensive and currently available raw materials, and giving as a by-product an aluminum alloy which is directly utilizable.

The advantages of this method are as follows:

(1) The material required is simple and inexpensive.

(2) It is possible to prepare large quantities, ranging from 1 kilogram to a ton of pure silicon in one single operation.

(3) With two or three purification operations, it is possible to treat either very impure silicon or ferro-silicons or aluminum-silicons, even partly oxidized or carburized, with the single condition that the alloy formed with the aluminum falls into the field of separation from silicon.

(4) At least in the first operations, the solvent metal employed does not require to be very pure. Only the final operation must be carried out with refined aluminum, which is however an industrial metal. In addition, about 85% of this metal is recovered in the form an Al—Si alloy which can either be recycled into the first extractions, as long as its impurity content is not prohibitive for this purpose, or alternatively it may be sold directly as an aluminum alloy.

It is possible, in the intermediate steps, to increase the amount of silicon recovered by reducing its solubility in aluminum by the addition of zinc or tin, for example, and by more quickly raising the purity of the silicon obtained by adding to the alloy additions having a substantial affinity for the impurities that are to be removed, as, for example, through the addition of titanium to remove boron.

Finally it is to be noted that the silicon obtained is not entirely pure; it is saturated in aluminum (0.02%) and its purity does not exceed 99.98%. It is necessary to proceed to further purification in order to enable the silicon to be used as a semi-conductor; this purification may be carried out for example by the melting zone method, but the method according to the invention enables this operation to be simplified owing to the fact that there remains only a single impurity which can easily be eliminated by the present method.

What I claim is:

1. A method of obtaining pure silicon by fractional crystallization, comprising forming a silicon-aluminum alloy by dissolving impure silicon in an aluminum base alloy at a temperature of about 30° to 50° C. higher than the point of solidification of said alloy, treating said liquid silicon-aluminum alloy with 1 to 2% of its weight of a flux containing 80% of sodium chloride and 20% of a member of the group consisting of sodium fluoride and cryolite to remove oxygen, carbon, and phosphorus present in said silicon-aluminum alloy, thereby forming dross, removing the dross, cooling said liquid silicon-aluminum alloy at a rate not greater than about 30° C. per hour, following a law represented by the equation $T=Kt^n$, where T is the fall in temperature in ° C. below the point of solidification of said alloy, $t$ is the time in hours, $n$ is 1 or 3, and K is a constant having a value not greater than about 30 but greater than 0 when $n$ is 1 and not greater than 0.08 but greater than 0 when $n$ is 3, until a sponge of large crystals is formed in a mother liquid containing impurities, drawing off the greater part of the mother liquid from the sponge before complete solidification of said silicon-aluminum alloy, draining mother liquid from the sponge and treating the sponge to remove impurities deposited during cooling of said silicon-aluminum alloy, and collecting the pure silicon thus obtained.

2. A method as claimed in claim 1, in which said aluminum base alloy is substantially pure aluminum.

3. A method as claimed in claim 1, in which said impure silicon is an alloy having a silicon base.

4. A method as claimed in claim 2, in which the aluminum base alloy contains between 0.1% and 0.2% of lead.

5. A method as claimed in claim 1, in which said aluminum base alloy is an aluminum alloy containing at least one element selected from the group consisting of silicon, zinc, tin, and titanium.

6. A method as claimed in claim 1, in which the steps preceding the collection of the pure silicon are repeated a plurality of times, utilizing at each operation the same aluminum base alloy.

7. A method as claimed in claim 1, in which the steps preceding the collection of the pure silicon are repeated a plurality of times, utilizing at each operation as the aluminum base alloy, an aluminum-base alloy of different composition.

8. A method as claimed in claim 1, in which the steps preceding the collection of the pure silicon are repeated a plurality of times, utilizing at each operation as the aluminum base alloy, an alloy derived from a subsequent operation of a previous cycle, the last treatment being then effected with refined aluminum, in order to eliminate all impurities other than aluminum.

9. A method of obtaining pure silicon by fractional crystallization, comprising forming a silicon-aluminum alloy by dissolving impure silicon in an aluminum base alloy at a temperature higher than the point of solidification of said silicon-aluminum alloy, treating said liquid silicon-aluminum alloy with 1 to 2% of its weight of a flux containing sodium chloride and a member of the group consisting of sodium fluoride and cryolite to remove oxygen, carbon and phosphorous present in silicon-aluminum alloy, thereby forming dross, removing the dross, cooling said liquid silicon-aluminum alloy at a rate not greater than about 30° C. per hour, following a law represented by the equation $T=Kt^n$, where T is the fall in temperature in ° C., below the point of solidification of said alloy, $t$ is the time in hours, $n$ is 1 or 3, and K is a constant having a value not greater than about 30 but greater than 0 when $n$ is 1 and not greater than 0.08 but greater than 0 when $n$ is 3, until a sponge of large crystals is formed in a mother liquid containing impurities, drawing off the greater part of the mother liquid from the sponge before complete solidification of said silicon-aluminum alloy, draining mother liquid from the sponge and treating the sponge to remove impurities deposited during cooling of said silicon-aluminum alloy, and collecting the pure silicon thus obtained.

References Cited in the file of this patent

UNITED STATES PATENTS

| | | |
|---|---|---|
| 2,469,418 | Striplin | May 10, 1949 |
| 2,760,859 | Gray | Aug. 28, 1956 |
| 2,848,321 | Bunbury et al. | Aug. 19, 1958 |
| 2,885,364 | Swartz | May 5, 1959 |

OTHER REFERENCES

Mellor: "A Comprehensive Treatise on Inorganic and Theoretical Chemistry," vol. 6 (1925), page 149, Longmans, Green and Co.